US008508435B2

(12) United States Patent
Sanders-Reed et al.

(10) Patent No.: US 8,508,435 B2
(45) Date of Patent: Aug. 13, 2013

(54) SITUATIONAL AWARENESS COMPONENTS OF AN ENHANCED VISION SYSTEM

(75) Inventors: John N. Sanders-Reed, Cedar Crest, NM (US); Michael K. Hollis, Albuquerque, NM (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/488,370

(22) Filed: Jun. 4, 2012

(65) Prior Publication Data

US 2012/0249592 A1 Oct. 4, 2012

Related U.S. Application Data

(62) Division of application No. 10/940,276, filed on Sep. 14, 2004, now Pat. No. 8,194,002.

(51) Int. Cl.
*G09G 5/00* (2006.01)

(52) U.S. Cl.
USPC ........................ 345/8; 345/7; 345/9

(58) Field of Classification Search
USPC ..... 345/7–9, 418–427, 629–633; 434/28–71; 715/757, 781, 782; 348/115, 121–124, 157; 382/154, 276, 286–301
See application file for complete search history.

(56) References Cited

U.S. PATENT DOCUMENTS

| | | | | |
|---|---|---|---|---|
| 5,388,990 A | * | 2/1995 | Beckman | 434/38 |
| 6,317,127 B1 | * | 11/2001 | Daily et al. | 345/629 |
| 7,289,130 B1 | * | 10/2007 | Satoh et al. | 345/629 |
| 2002/0153485 A1 | | 10/2002 | Nixon et al. | |
| 2004/0263626 A1 | * | 12/2004 | Piccionelli | 348/157 |

* cited by examiner

*Primary Examiner* — Amare Mengistu
*Assistant Examiner* — Jennifer Zubajlo
(74) *Attorney, Agent, or Firm* — Parsons Behle & Latimer (57) ABSTRACT

A virtual sphere provided by an enhanced vision system includes synthetic imagery filling said virtual sphere and a common view window mapped to a dedicated position within the synthetic imagery. Imagery of the line of sight of a user is displayed in the common view window. By providing the common view window, visual communication between all users may be possible. By connecting a virtual user to the enhanced vision system and by displaying the imagery for the line of sight of the virtual user in the common view window, the workload of a human operator may be reduced and the time line of actions may be shortened. The enhanced vision system of the present invention may be used, but is not limited to, in a military aircraft to enhance the situational awareness of the flight crew.

25 Claims, 3 Drawing Sheets

SITUATIONAL AWARENESS COMPONENTS OF AN ENHANCED VISION SYSTEM

This application is a divisional of U.S. patent application Ser. No. 10/940,276, filed Sep. 14, 2004, now U.S. Pat. No. 8,194,002 and entitled "Situational Awareness Components of an Enhanced Vision System," the disclosure of which is hereby incorporated by reference in its entirety.

BACKGROUND OF THE INVENTION

The present invention generally relates to enhanced vision systems and, more particularly, to situational awareness components of an enhanced vision system and a method for enhancing flight crew situational awareness.

The maintenance of situational awareness has always been and is still today a pilot's uppermost concern. Loss of situational awareness is most often a main factor in airplane accidents, which is true for commercial aircraft as well as for military aircraft. One of the most dangerous challenges military aviators face is poor visibility, especially during operations in unprepared environments. In recent years, enhanced vision systems have been developed that improve the ability of pilots to see airport features and surrounding terrain at night and during periods of reduced visibility while flying close to the ground. Still, with constantly increasing complexity of the tasks of a flight crew, especially of a crew flying a military plane involved in war actions, there is a need to further develop existing enhanced vision systems in order to enhance flight crew situational awareness. For example, a flight crew of a military airplane carrying a weapon, such as the advanced tactical laser (ATL) or a gunship, needs to maintain common awareness for battle space while focused on individual tasks. A weapon operator may be narrowly focused on a single target while cockpit crewmembers may have broad situational awareness. If the cockpit crew becomes aware of an important new development, the cockpit crew needs to rapidly cue the weapon operator. Similarly, a battle manager may observe an emerging threat to the aircraft and need to notify the cockpit crew immediately, for example, by visually cueing them. Furthermore, it may happen that only one of the crewmembers becomes aware of a newly developing situation. In this case, this crewmember needs to be able to communicate with the other crewmembers. Presently, there is no effective solution on how to share visual information among flight crewmembers, such as a weapon operator or a battle manager, to rapidly cue other members to targets or situations observed by one crewmember.

Furthermore, a weapon operator, for example, an ATL weapon operator, needs to maintain situational awareness of multiple targets, while focused on a single target at a time. Currently, the weapon operator is required to search for each target separately. While focused on one target, other targets may move under cover, making it harder for the weapon operator to search for them. Therefore, if more than one target needs to be tracked at the same time, prior art requires one operator for each target to be tracked.

Another task that requires situational awareness of the flight crewmembers, for example, of a low flying helicopter, is obstacle detection, for example, of power lines, since striking a power line will be disastrous for any aircraft. Passive power line detection systems for aircraft have been developed, for example, U.S. Patent Application No. US2002/0153485 A1 published by Nixon et. al. This obstacle detection system determines the presence of small, curvilinear objects, such as power lines. While the detected objects will be displayed for the pilot such that evasive maneuvers can be performed by the pilot as necessary, the pilot cannot change his line of sight and look to the right or left. The pilot's line of sight needs to be where he suspects, for example, power lines.

Prior artificial vision systems typically use a single turreted sensor system that is slaved to a pilot's line of sight. As the pilot turns his head, the entire turret rotates to follow his line of sight. Consequently, all users can see imagery only in the pilot's line of sight. Thus, if the pilot is looking to one side, an operator aide, such as an obstacle detection system or a tracking system, can only view imagery in that direction. Using prior art vision systems it is not possible that the users can independently monitor views in different directions.

Currently a next generation of enhanced vision systems (EVS) is being developed, for example, the enhanced vision system described by Yelton, Bernier, and Sanders-Reed in Proc SPIE, 5424, April 2004, hereby incorporated by reference, combine imagery from multiple sensors, possibly running at different frame rates and pixel counts, onto a display. In the case of a helmet mounted display (HDM), the user line of sight is continuously changing with the result that the sensor pixels rendered on the display are changing in real time. In a prior art enhanced vision system, the various sensors provide overlapping fields of view, which requires stitching imagery together to provide a seamless mosaic to the user. Furthermore, different modality sensors may be present requiring the fusion of imagery from the sensors having a common field of view. Still further, it is possible to combine sensor imagery with synthetic imagery, such as 3D terrain from digital elevation maps, overhead satellite imagery, or flight path symbology. The output of an enhanced vision system may be presented on a head-down, head-up, or helmet mounted display. All of this takes place in a dynamic flight environment where the aircraft (with fixed mounted sensors) is changing position and orientation while the users are independently changing their lines of sight. Modern enhanced vision systems, for example, the enhanced vision system described by Yelton, Bernier, and Sanders-Reed, may provide new opportunities for visual sharing information and for using independent operator aides and intelligent agents, not available in systems pre-dating enhanced vision systems. However, current prior art enhanced vision systems are "dumb" systems in the sense that these systems provide integrated imagery to a human user who supplies all the intelligence for interpretation.

Prior art further includes, for example, an enhanced vision system called "Flying Infrared for Low-level Operations" (FLILO) disclosed by Guell in IEEE AES Systems Magazine, September 2000, pp. 31-35. FLILO enhances situational awareness for safe low level/night time and moderate weather flight operations, such as take-off, landing, taxiing, approaches, drop zone identification and short austere airfield operations. FLILO provides electronic/real time vision to the pilots through a series of imaging sensors, an image processor, and a wide field-of-view see-through helmet mounted display integrated with a head tracker. While enhancing the situational awareness of a flight crew, the FLILO enhanced vision system does not offer visual communication between flight crew members or allows the user to maintain situational awareness of multiple tasks.

As can be seen, there is a need for increasing not only the pilot's situational awareness but also the flight crew's situational awareness. Furthermore, there is a need to enable instant visual communication between a cockpit crew, a weapon operator, a battle manager, or other personnel of a military aircraft. Also, there is a need to share visual information among cockpit crewmembers. Moreover, a need exists to enable a weapon operator to maintain situational awareness of multiple targets. Still further, there is a need to add "intelligent" components to existing enhanced vision systems that may provide help to human users or that may replace human users.

There has, therefore, arisen a need to provide components that enable sharing of visual information among flight crew members and that may be added to existing enhanced vision systems. There has further arisen a need to provide components that reduce the workload of an operator, such as a weapon operator, and that may be added to prior art enhanced vision systems. There has still further arisen a need to provide "intelligent" components that may handle various flight and battle operations based on the broad area coverage provided by an enhanced vision system.

SUMMARY OF THE INVENTION

The present invention provides situational awareness components of enhanced vision systems and a method for enhancing flight crew situational awareness. The present invention further provides a platform for sharing visual information among flight crewmembers. The present invention still further provides components that combine tasks, such as automatic target tracking, obstacle detection, or blind spot monitoring, with the broad area coverage provided by an enhanced vision system. These components may be used as, but are not limited to, operator aides or intelligent agents to assist, for example, battle managers and payload managers, of military aircraft carrying an advanced tactical laser or gunship. The present invention still further provides a method for enhancing flight crew situational awareness.

In one aspect of the present invention, a virtual sphere provided by an enhanced vision system comprises synthetic imagery filling the virtual sphere and a common view window mapped to a dedicated position within the synthetic imagery. The imagery of the line of sight of a user is displayed in the common view window.

In another aspect of the present invention, a virtual sphere provided by an enhanced vision system comprises sensor synthetic imagery filling the virtual sphere, sensor imagery overlaying the synthetic imagery, a first common view window mapped to a dedicated position within the synthetic imagery, and a second common view window mapped to a dedicated position within the synthetic imagery. The imagery of the line of sight of a first user is displayed in the first common view window. The imagery of the line of sight of a second user is displayed in the second common view window.

In still another aspect of the present invention, an enhanced vision system comprises a plurality of physical sensors providing sensor imagery; synthetic imagery supplementing the sensor imagery and including a common view window mapped to a dedicated position within the synthetic imagery, a first user, and a second user. The first user is a human operator wearing a helmet mounted display. The common view window is visible in the helmet mounted display. The human operator selects the position of the common view window in the helmet mounted display. The second user is a virtual user.

In a further aspect of the present invention, an enhanced vision system comprises a plurality of physical sensors providing sensor imagery; synthetic imagery supplementing the sensor imagery; a video distribution module, a first enhanced vision system processor receiving imagery from the video distribution module, a second enhanced vision system processor receiving imagery from the video distribution module, a third enhanced vision system processor receiving imagery from the video distribution module, a first human operator connected with the first enhanced vision system processor, a second human operator connected with the second enhanced vision system processor, and a virtual user connected with the third enhanced vision system processor. The synthetic imagery includes a first common view window mapped to a dedicated position within the synthetic imagery and a second common view window mapped to a dedicated position within the synthetic imagery. The video distribution module combines the sensor imagery and the synthetic imagery. The first human operator wears a first helmet mounted display. The first common view window and the second common view window are visible in the first helmet mounted display. The second human operator wears a second helmet mounted display. The first common view window and the second common view window are visible in the second helmet mounted display. In still a further aspect of the present invention, an enhanced vision system comprises a plurality of physical sensors fixed mounted to an aircraft providing sensor imagery, synthetic imagery supplementing the sensor imagery, a video distribution module, a first enhanced vision system processor receiving imagery from the video distribution module, a second enhanced vision system processor receiving imagery from the video distribution module, a third enhanced vision system processor receiving imagery from the video distribution module, a first human operator connected with the first enhanced vision system processor, a second human operator connected with the second enhanced vision system processor, and a passive obstacle detection device connected with the third enhanced vision system processor. The synthetic imagery includes a first common view window mapped to a dedicated position within the synthetic imagery, a second common view window mapped to a dedicated position within the synthetic imagery, and a third common view window mapped to a dedicated position within the synthetic imagery. The video distribution module combines the sensor imagery and the synthetic imagery. The first human operator is on board of the aircraft. The second human operator is off board of the aircraft. The first human operator sends a line of sight pointing request to the first enhanced vision system processor. The first human operator receives imagery for the requested line of sight from the first enhanced vision system processor. The imagery is displayed in the first common view window. The second human operator sends a line of sight pointing request to the second enhanced vision system processor. The second human operator receives imagery for the requested line of sight from the second enhanced vision system processor. The imagery is displayed in the second common view window. The passive obstacle detection device sends a line of sight pointing request to the third enhanced vision system processor. The passive obstacle detection device receives imagery for the requested line of sight from the third enhanced vision system processor. The imagery is displayed in the third common view window.

In still another aspect of the present invention, a method for enhancing flight crew situational awareness comprises the steps of: equipping an aircraft with an enhanced vision system including a common view window; connecting a first human operator with the enhanced vision system; producing line of sight imagery for the first human operator with the enhanced vision system; connecting a virtual user with the enhanced vision system; producing line of sight imagery for the virtual user with the enhanced vision system; displaying the line of sight imagery of the virtual user in the common view window; alerting the first human operator; and viewing line of sight of the virtual user by the first human operator.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, an embodiment of the present invention provides situational awareness components of an enhanced vision system. Contrary to the known prior art, the spherical coverage provided by an enhanced vision system as in one embodiment of the present invention includes at least one common view window that displays the line of sight of a designated flight crewmember. Furthermore, operator aides and intelligent agents as in another embodiment of the present invention can be added to existing enhanced vision systems as virtual crewmembers. Enhanced vision systems including situational awareness components as in one embodiment of the present invention may be used, for example, in military aircraft to enhance the situational awareness of the flight crew. The situational awareness components as in another embodiment of the present invention may be used as, but are not limited to, operator aides or intelligent agents to assist, for example, battle managers of a military helicopter carrying an advanced tactical laser or gunship, or payload managers of a transport aircraft. By using an enhanced vision system as in one embodiment of the present invention it may be possible that a human user, independent operator aides and intelligent agents, such as an obstacle detection system or a tracking system, can independently monitor views in different directions, which is not possible using prior art single turreted sensor systems. Furthermore, it may be possible, to use the enhanced vision system as in one embodiment of the present invention in ground vehicles, such as truck, ships, etc., both military and commercial.

In one embodiment, the present invention provides a common view window incorporated within a virtual sphere provided by a prior art enhanced vision system. The imagery displayed in this common view window may be designated to the line of sight of a designated flight crewmember. This enables all other flight crew members to follow the line of sight of the designated crewmember and adjust their own line of sight if needed. Prior art enhanced vision systems do not provide components that allow communication between flight crew members as in one embodiment of the present invention.

An embodiment of the present invention further provides a plurality of common view windows incorporated within a virtual sphere provided by a prior art enhanced vision system. Each of the common view windows could be assigned to the line of sight of one flight crewmember further enhancing the communication between flight crewmembers. Contrary to the prior art, where each flight crewmember receives the various sensor images independently and only sees images in his line of sight; it will be possible, by adding the common view windows as in one embodiment of the present invention, that each crew member also follows the line of sight of each of the other crew members. By providing a plurality of common view windows as in one embodiment of the present invention, it may further be possible that one flight crew member alerts the other flight crew members of his line of sight and that each of the other crew members may switch their line of sight directly to the alerted line of sight. Such communication between flight crewmembers is not possible using prior art enhanced vision systems.

An embodiment of the present invention further provides virtual users of an enhanced vision system, such as operator aides and intelligent agents, that could assist or even replace human operators, for example, flight crew members of a military aircraft or a transport aircraft. The imagery for the line of sight of operator aides as in one embodiment of the present invention, for example, automatic target trackers and passive obstacle detection systems, may be included as part of the synthetic vision overlay of the enhanced vision system to the human operator, such as a flight crew member. Contrary to the known prior art, operator aides, such as automatic target trackers, as in one embodiment of the present invention could enable, for example, a weapons operator to track multiple targets instead of tracking only one target. By combining, for example, automatic target trackers with wide coverage sensors available through prior art enhanced vision systems, the existing standard auto tracker technology can be extended and the flight crew situational awareness can be enhanced. By providing intelligent agents, integrated imagery provided by an enhanced vision system can be interpreted by an electronic processing unit instead of supplying all the intelligence for interpretation of the imagery by a human user as currently done.

An embodiment of the present invention further provides a method for enhancing flight crew situational awareness. By providing a platform that enables sharing of visual information obtained from a prior art enhanced vision system among flight crew members as in one embodiment of the present invention, the flight crew awareness can be improved compared to prior art methods. By adding virtual users, such as operator aides and intelligent agents, to an existing enhanced vision system, the situational awareness of each flight crewmember may be enhanced by reducing the workload of the human operator. Furthermore, the timeline of operations may be improved using the method for enhancing flight crew situational awareness as in one embodiment of the present invention compared to prior art methods that only use a prior art enhanced vision system.

Figure 1:
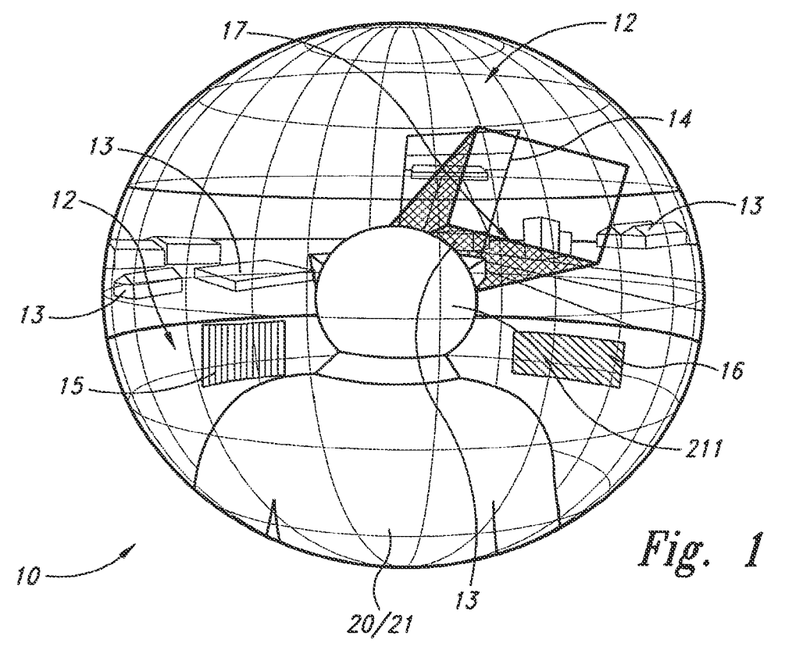
FIG. 1 is a schematic view of a virtual sphere provided by an enhanced vision system according to one embodiment of the present invention.
Figure 3:
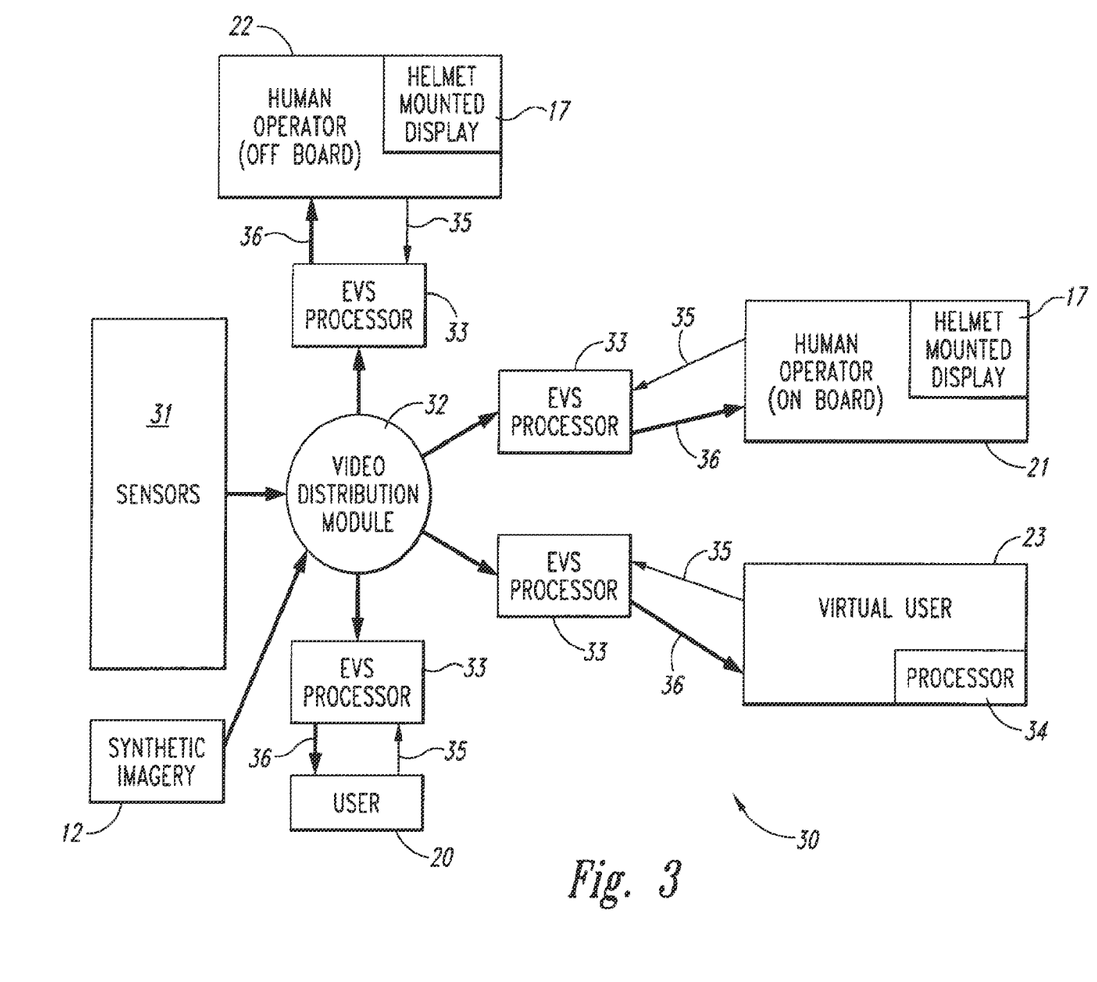
FIG. 3 is a block diagram of an enhanced vision system according to one embodiment of the present invention.

Referring now to FIG. 1, a schematic view of a virtual sphere 10 provided by an enhanced vision system 30 to a user 20 is illustrated according to one embodiment of the present invention. The virtual sphere 10 may include synthetic imagery 12 and sensor imagery 13. The synthetic imagery 12 may fill the entire virtual sphere 10. The sensor imagery 13 may overlay the synthetic imagery 12 according to the position of fixed physical sensors 31 (shown in FIG. 3), for example, on an aircraft. Images provided by the physical sensors 31 (illustrated in FIG. 3), such as visible light cameras and infrared cameras, may be stitched together to a combined multi-spectral image viewable as sensor imagery 13 by the user 20. The user 20 may be a human operator 21, as shown in FIG. 1 or a virtual user 23, as shown in FIG. 3. The sensor imagery 13 may further include images from modality sensors, such as an image 14 from a rear view mirror sensor. The sensors 31 providing the sensor imagery 13 may be preferably fixed mounted sensors mounted to an aircraft. Consequently, the sensors 31 change position and orientation as the aircraft does. The synthetic imagery 12 may include a synthetic map 15 created from a digital terrain database and a common view window 16. The synthetic imagery 12 may further include overhead satellite imagery and flight path symbology (not shown). The sensor imagery 13 and the synthetic imagery 12 may be combined by the enhanced vision system 30 (FIG. 3) to provide the spherical coverage 10. It may also be possible to turn off the sensor imagery 13, for example, in conditions of zero visibility, and to use the synthetic imagery 12 only. The output of the enhanced vision system 30 may be presented on a helmet mounted display 17. The output of the enhanced vision system 30 may further be presented on a head-down or head-up display (not shown). The human operator 21 may wear a helmet mounted display 17 and may change his line of sight by turning his head 211. More than one human operator 21 may be connected to the enhanced vision system 30. Each human operator 21 may wear a helmet mounted display 17 and may change his line of sight independently from other human operators 21. The common view window 16 may be visible in the helmet mounted display 17. The human operator 21 may be a member of a flight crew, such as a pilot, a cockpit crewmember, a weapon operator, a battle manager, or a payload manager on board of an aircraft. The human operator 21 may further be a remote operator on the ground for an unmanned aircraft, a human operator (off board) 22.

As shown in FIG. 1, the common view window 16 may be mapped to a dedicated position on the virtual sphere 10 within the area of synthetic imagery 12. Alternatively, the human operator 21 may be able to select the position of the common view window 16 in his helmet mounted display 17 as desired. Furthermore, the common view window 16 may be programmed to follow the line of sight of the human operator 21. Programming the common view window 16 to follow the line of sight of a human operator 21 may enable the human operator 21 to drag the common view window 16 around the virtual sphere 10 while he is trying to find the same imagery in his helmet mounted display 17 as displayed in the common view window 16. The imagery displayed in the common view window 16 may be assigned to the line of sight of a human operator 21, such as a flight crewmember, that takes control of the common view window 16. Consequently, all human operators 21 connected to the enhanced vision system 30, for example, all flight crewmembers may view the line of sight of the human operator 21 that took control of the common view window 16. If needed, a different human operator 21 may take control of the common view window 16 to alert the other users 20. The common view window 16 may then display the line of sight of the human operator 21 that took control of the common view window 16 visible to all users 20 of the enhanced vision system 30. For example, the co-pilot of an aircraft may take control of the common view window 16. Wherever the co-pilot may look, his line of sight will be displayed in the common view window 16 visible for all other flight crewmembers in their helmet mounted displays 17. If one of the other flight crewmembers sees a imagery 12 or 13 in his helmet mounted display 17 that he wants to share, this flight crewmember takes control of the common view window 16 and instantly, this information becomes visible in the common view window 16 that may be visible in the helmet mounted display 17 of each crewmember. The user 20 that takes control of the common view window 16 may further be a remote operator 22 (as shown in FIG. 3). The user 20 that takes control of the common view window 16 may further be a virtual user 23 (as shown in FIG. 3). It may further be desirable to add some information to the imagery displayed in the common view window 16, for example, information identifying the human operator that has control of the common view window 16. Enabling the human operator 21 who has control of the common view window 16 to draw overlays on the imagery displayed in the common view window 15 may further enhance the graphic communication between human operators 21.

Figure 2:
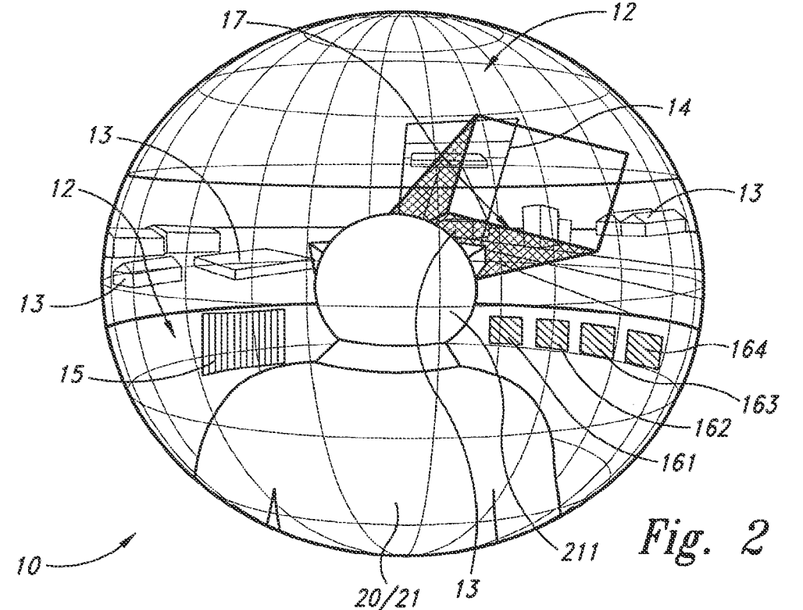
FIG. 2 is a schematic view of a virtual sphere provided by an enhanced vision system according to another embodiment of the present invention.

Referring now to FIG. 2, a schematic view of a virtual sphere 10 provided by an enhanced vision system 30 to a user 20 is illustrated according to another embodiment of the present invention. The virtual sphere 10 may include sensor imagery 13 and synthetic imagery 12. The sensor imagery 13 may contain a combined multi-spectral image. The synthetic imagery 12 may include a synthetic map 15, a common view window 161, a common view window 162, a common view window 163, and a common view window 164. The common view window 161, the common view window 162, the common view window 163, and the common view window 164 may be visible in the helmet mounted display 17 of a first human operator 21 (on board), in the helmet mounted display 17 of a second human operator 21 (on board), and in the helmet mounted display 17 of a third human operator 22 (off board). The common view window 161 may display the imagery of the line of sight of a first human operator 21 (on board). The common view window 162 may display the imagery of the line of sight of the second human operator 21 (on board). The common view window 163 may display the imagery of the line of sight of the third human operator 22 (off board). The common view window 164 may display the imagery of the line of sight of a user 20. The first human operator and the second human operator may be on board, for example, of an aircraft and, therefore, at the same location as the enhanced vision system 30. The third human operator 22 may be a remote operator that is off board, for example, of an aircraft and, therefore, at a different location than the enhanced vision system 30. The user 20 may be an additional human operator 21 (on board), an additional human operator 22 (off board), or a virtual user 23 (FIG. 3). The virtual user 23 may be an operator aide or an intelligent agent. Additional common view windows 16 may be mapped on the virtual sphere 10 besides the common view windows 161, 162, 163, and 164 (shown in FIG. 2). The imagery displayed in the common view windows 161, 162, 163, and 164 may be assigned to a specific user 20 as described above. It may further be possible that any human operator 21 connected to the enhanced vision system 30 may take control of the common view window 161 as needed.

Referring now to FIG. 3, a block diagram of an enhanced vision system 30 is illustrated according to one embodiment of the present invention. The enhanced vision system 30 may include a plurality of physical sensors 31, synthetic imagery 12, a video distribution module 32, a plurality of enhanced vision system processors 33, and a plurality of users 20. The sensors 31 may provide images that may be stitched together to create the sensor imagery 13 (FIG. 1). The synthetic imagery 12 may supplement the sensor imagery 13. The video distribution module 32 may combine the sensor imagery 13 and the synthetic imagery 12 to form the virtual sphere 10 (FIG. 1). The video distribution module 32 may distribute the combined imagery data to the enhanced vision system processors 33. Each enhanced vision system processor 33 may receive a line of sight pointing request 35 from a user 20. Corresponding to the line of sight pointing request 35 from the user 20, the enhanced vision system processor 33 may provide imagery 36 for the requested line of sight to the user 20. The quantity of enhanced vision system processors 33 connected with the video distribution module 32 may depend on the quantity of users 20 and may further be equal to the quantity of users 20. The user 20 may be a human operator 21 that is on board, a human operator 22 that is off board, or a virtual user 23. The virtual user 23, such as an operator aide or an intelligent agent, may include a processor 34. The human operator may be a flight crewmember of an aircraft, such as a pilot, a co-pilot, a weapons operator, a battle manager, or a payload manager. In the case that the user 20 is a human operator 21 (on board) or a human operator 22 (off board), the human operator 21 or 22 may wear a helmet mounted display 17 and the human operator 21 or 22 may send a line of sight pointing request 35 to the enhanced vision system processor 33 by turning their head 211 (FIG. 1). The enhanced vision processor 33 may then send imagery 36 for the requested line of sight to the human operator 21 or 22. The received imagery 36 may be displayed on the helmet mounted display 17 of the human operator 21 or 22. The human operator 21 or 22 may then provide the analysis, processing, and interpretation of the received imagery 36. In the case that the user 20 is a virtual user 23, the processor 34 may send a line of sight pointing request 35 to the enhanced vision system processor 33. The enhanced vision processor 33 may then send imagery 36 for the requested line of sight to the processor 34 of the electronic processing unit 23. The processor 34 may provide the processing of the imagery 36 received from the enhanced vision system processor 33. Further, the imagery 36 received by the processor 34 may be displayed in the helmet mounted display 17 of the human operator 21 or 22, for example, visible in the common view window 164 (as shown in FIG. 2).

The processor 34 may be an operator aide processor. Operator aides may be, for example, a passive obstacle detection device. The processor 34 may have a forward facing line of sight, may send a pointing request 35 for this forward facing line of sight, and may always receive imagery 36 provided by the forward facing sensors regardless of the line of sight of the human operator 21. The imagery 36 received by the processor 34 may be displayed in the helmet mounted display 17 of the human operator 21, for example, in the common view window 164 (as shown in FIG. 2). The processor 34 may further sound an alarm if an obstacle is detected in the flight path, the human operator 21 may change his line of sight immediately to the line of sight of the processor 34 and take action as needed. Furthermore, a transport aircraft equipped with the enhanced vision system 30 may have rear looking sensors 31 that may, for example, monitor cargo deployment. The processor 34 of the virtual user 23 may receive imagery 36 provided by these rear looking sensors 31. The imagery 36 received by the processor 34 may be displayed in the helmet mounted display 17 of the human operator 21, for example, in the common view window 164 (as shown in FIG. 2). The processor 34 may visually alert the human operator 21 using, for example, the common view window 164. The processor 34 may further sound an alarm if a problem is detected in the cargo area, the human operator 21 may change his line of sight immediately to the line of sight of the processor 34 and take action as needed.

The processor 24, as shown in FIG. 3, may further be a processor of an intelligent agent. One user 20 of the enhanced vision system 30 may be a tracking system. The tracking system may be a virtual user 23 that may include a processor 34 for each tracker. The tracking system may be able to track an object as the object moves relative to the aircraft. The processor 34 of a tracker may send a pointing request 35 for its current line of sight to a target. This will generate output imagery 36 centered on the target, which the processor 34 of the tracker uses to update its line of sight. As the target moves, the tracker may follow the target within the sensor (31) boundaries. The imagery 36 of the line of sight received by the processor 34 of the tracker and, therefore, the position of the moving target may be displayed on the helmet mounted display 17 of the human operator 21, for example, in the common view window 164 (FIG. 2). Such tracking system may be used, for example, by a weapon operator. The weapons operator may also be a human operator 21 as illustrated in FIGS. 1, 2, and 3. The weapon operator 21 may, for example, identify three targets. The weapon operator 21 may initiate an automatic tracker on each of the three targets. While the weapon operator 21 is dealing with one target, the trackers may keep track of the other two targets. When the weapon operator 21 is ready to deal with one of these targets, he may quickly reacquire the target even if the target is hidden from the weapon operator's 21 view. Consequently, the currently exiting auto tracker technology may be extended by using wide coverage sensors 31 of the enhanced vision system 30. Virtual users 23 may further include adaptive cruise control, station keeping, and blind spot monitoring.

Figure 4:
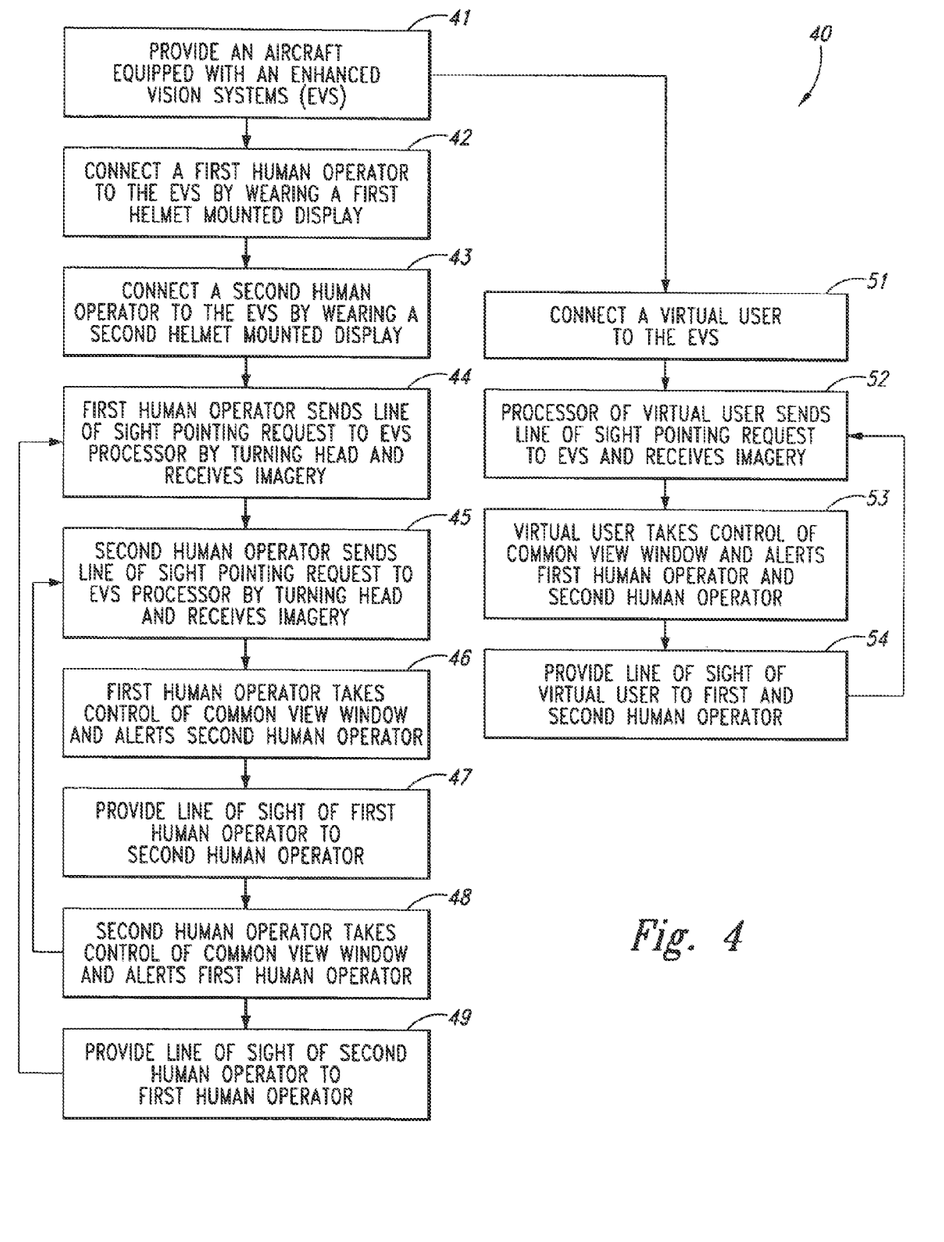
FIG. 4 is a flow chart of a method for enhancing flight crew situational awareness according to one embodiment of the present invention.

Referring now to FIG. 4, a flow chart of a method 40 for enhancing flight crew situational awareness is illustrated according to another embodiment of the present invention. The method 40 for enhancing flight drew situational awareness may include the steps of: providing an aircraft equipped with an enhanced vision system 30 as illustrated in FIG. 3 (step 41), connecting a first human operator 21 with the enhanced vision system 30 by wearing a first helmet mounted display 17 (step 42) (as shown in FIG. 1), connecting a second human operator 21 with the enhanced vision system 30 by wearing a second helmet mounted display 17 (step 43) (as shown in FIG. 1). The method 40 may further include the steps of: sending a line of sight pointing request 35 from first human operator 21 to the enhanced vision system processor 33 by turning head 211 and receiving imagery 36 displayed in the first helmet mounted display 17 (step 44) (as shown in FIG. 3) and sending a line of sight pointing request 35 from second human operator 21 to the enhanced vision system processor 33 by turning head 211 and receiving imagery 36 displayed in the second helmet mounted display 17 (step 45)(as shown in FIG. 3). The first human operator 21 may then take control of common view window 16 illustrated in FIG. 1 alerting the second human operator 21 (step 46). The imagery 36 for the line of sight of the line of sight of the first human operator 21 may be displayed in the common view window 16 visible for the second human operator 21 (step 47). Seeing a new event occurring in his line of sight, the second human operator 21 may take control of common view window 16 illustrated in FIG. 1 alerting the first human operator 21 (step 48). The imagery 36 (as shown in FIG. 3) for the line of sight of the second human operator 21 will now be displayed in the common view window 16 visible for the first human operator 21 (step 49).

The method 40 may further include the steps of: connecting a virtual user 23 to the enhanced vision system 30 (step 51), sending a line of sight pointing request 35 from processor 34 of the virtual user 23 to the enhanced vision system processor 33, and receiving imagery 36 (step 52) as illustrated in FIG. 3. The virtual user 23 may take control of the common view window 16 alerting the first human operator and the second human operator 21 (step 53). The imagery 36 for the line of sight of the line of sight of virtual user 23 may be displayed in the common view window 16 visible for the first human operator 21 and second human operator 21 (step 54). By providing the common view window 16 in the synthetic imagery 12 on the virtual sphere 10, for example, as in step 41, visual communication between the first human operator 21 and the second human operator 21 may be possible. By connecting a virtual user 23 to the enhanced vision system 30 as in step 51 and by displaying the imagery 36 for the line of sight of the virtual user 23 in the common view window 16 (as in step 53), the workload of the human operator 21 may be reduced and the time line of actions may be shortened. By providing more than one common view window 16 (as illustrated in FIG. 2), the flight crew situational awareness may be further enhanced. Even though the enhanced vision system 30 as in one embodiment of the present invention has been described to be used by pilots of an military aircraft, it may be possible to use the enhanced vision system 30 in commercial aircrafts and, furthermore, in ground vehicles, such as truck, ships, etc., both military and commercial.

It should be understood, of course, that the foregoing relates to exemplary embodiments of the invention and that modifications may be made without departing from the spirit and scope of the invention as set forth in the following claims.

We claim:

1. An enhanced vision system, comprising:
a plurality of physical sensors providing sensor imagery;
synthetic imagery supplementing the sensor imagery and including a common view window mapped to a dedicated position within the synthetic imagery;
a helmet-mounted display, configured to be worn by a first user, the common view window being visible in the helmet-mounted display at a position that is selectable by the first user; and
a second, virtual user including a processor and configured to provide processing of the sensor imagery and the synthetic imagery.

2. The enhanced vision system of claim 1, further comprising:
a video distribution module, configured to combine the sensor imagery and the synthetic imagery; and
first and second enhanced vision system processors, configured to receive the combined sensor imagery and synthetic imagery from the video distribution module and connected with the helmet-mounted display and the second, virtual user, respectively.

3. The enhanced vision system of claim 2, wherein the first enhanced vision system processor is configured to receive a line-of-sight pointing request from the first user, and to send imagery for the requested line-of-sight to the helmet-mounted display, the imagery being displayed in the common view window.

4. The enhanced vision system of claim 2, wherein the second enhanced vision system processor is configured to receive a line-of-sight pointing request from the second, virtual user, and to send imagery for the requested line-of-sight to the processor of the second, virtual user, the imagery being displayed in the common view window.

5. The enhanced vision system of claim 2, further comprising a third enhanced vision system processor configured to receive imagery from the video distribution module.

6. The enhanced vision system of claim 5, further comprising:
a third enhanced vision system processor configured to receive imagery from the video distribution module; and
a second helmet-mounted display, configured to be worn by a third user, the common view window being visible in the second helmet-mounted display at a position that is selectable by the third user.

7. The enhanced vision system of claim 5, further comprising a passive obstacle detection device, configured to send a line-of-sight pointing request to the third enhanced vision system processor, and to receive imagery for the requested line-of-sight from the third enhanced vision system processor, the imagery being displayed in the common view window.

8. The enhanced vision system of claim 2, further including an additional enhanced vision system processor, configured to:
receive imagery from the video distribution module;
receive a line-of-sight pointing request from an additional user; and
send imagery for the requested line-of-sight to the additional user, the imagery being displayed in the common view window.

9. The enhanced vision system of claim 8, wherein the physical sensors are associated with a vehicle that is configured to have the additional user on-board the vehicle.

10. The enhanced vision system of claim 8, wherein the physical sensors are associated with a vehicle that is configured to have the additional user off-board the vehicle.

11. The enhanced vision system of claim 8, further comprising a second virtual display, configured to display the common view window and to be used by the additional user.

12. The enhanced vision system of claim 1, wherein the physical sensors are mounted to an aircraft.

13. The enhanced vision system of claim 1, wherein the second, virtual user comprises an operator aide, intelligent agent, passive obstacle detection device, tracking system, adaptive cruise control, station keeping system, or blind spot monitoring system.

14. An enhanced vision system, comprising:
a plurality of physical sensors providing sensor imagery;
synthetic imagery supplementing the sensor imagery, the synthetic imagery including first and second common view windows mapped to respective dedicated positions within the synthetic imagery;
a video distribution module, configured to combine the sensor imagery and the synthetic imagery;
first, second and third enhanced vision system processors, configured to receive imagery from the video distribution module;
first and second helmet-mounted displays, connected with the first and second enhanced vision system processors, respectively, configured to be worn by first and second users, respectively, the first and second common view windows being visible in the first and second helmet-mounted displays, respectively; and
a virtual user including a processor and connected with the third enhanced vision system processor.

15. The enhanced vision system of claim 14, wherein the first and second enhanced vision system processors are configured to
receive line-of-sight pointing requests from the first and second users, respectively; and
send imagery for the line-of-sight requests to the first and second users, respectively, the first and second common view windows being programmed to follow in the line-of-sight of the first and second users, respectively.

16. The enhanced vision system of claim 14, wherein the third enhanced vision system processor is configured to receive a line-of-sight pointing request from the virtual user, and to send imagery for the requested line-of-sight to the processor of the virtual user, the imagery being displayed in a third common view window visible for the first user and for the second user.

17. The enhanced vision system of claim 14, further including:
- an additional common view window mapped to a dedicated position within the synthetic imagery; and
- an additional enhanced vision system processor, configured to receive imagery from the video distribution module;
  - receive a line-of-sight pointing request from an additional user; and
  - send the requested line-of-sight imagery to the additional user, the imagery being displayed in the additional common view window.

18. The enhanced vision system of claim 14, wherein the virtual user comprises an operator aide, intelligent agent, passive obstacle detection device, tracking system, adaptive cruise control, station keeping system, or blind spot monitoring system.

19. An enhanced vision system, comprising:
- a plurality of physical sensors mounted to an aircraft, configured to provide sensor imagery;
- synthetic imagery supplementing the sensor imagery, the synthetic imagery including first, second, and third common view windows, each common view window mapped to a respective dedicated position within the synthetic imagery;
- a video distribution module, configured to combine the sensor imagery and the synthetic imagery; and
- first, second, and third enhanced vision system processors, configured to receive first, second, and third imagery from the video distribution module, the first enhanced vision system processor being configured for use by a first user on-board of the aircraft, the second enhanced vision system processor being configured for use by a second user off-board of the aircraft, and the third enhanced vision system processor being configured for use by a third, virtual user including a processor, the first, second, and third enhanced vision system processors being configured to receive line-of-sight pointing requests from the first, second, and third users, respectively, and to send the first, second, and third imagery for the line-of-sight requests to the first, second, and third common view windows, respectively;
- wherein at least one of the line-of-sight pointing requests comprises a currently existing line-of-sight, and the first, second, and third imagery is simultaneously displayable and independently viewable by the first, second, and third users, whereby the currently existing line-of-sight may be communicated to and followed by both of the first and second users.

20. The enhanced vision system of claim 19, wherein the first user is a pilot of the aircraft.

21. The enhanced vision system of claim 19, wherein the imagery displayed in the first, second and third common view windows is visible to the first and second users.

22. The enhanced vision system of claim 19, further comprising:
- a third common view window, mapped to a dedicated position within the synthetic imagery;
- a third enhanced vision system processor, configured to receive the first and second imagery from the video distribution module; and
- a passive obstacle detection device connected with the third enhanced vision system processor, configured to send a line-of-sight pointing request to the third enhanced vision system processor, to receive third imagery for the requested line-of-sight from the third enhanced vision system processor, and to provide a visual alert to the first and second users, the imagery being displayed in the third common view window.

23. The enhanced vision system of claim 19, wherein the third, virtual user comprises an operator aide, intelligent agent, passive obstacle detection device, tracking system, adaptive cruise control, station keeping system, or blind spot monitoring system.

24. The enhanced vision system of claim 19, further comprising:
- an additional common view window mapped to a dedicated position within the synthetic imagery; and
- an additional enhanced vision system processor, configured to:
  - receive imagery from the video distribution module;
  - receive a line-of-sight pointing request from an additional user; and
  - send the requested line-of-sight imagery to the additional user, the imagery being displayed in the additional common view window.

25. An enhanced vision system, comprising:
- a plurality of physical sensors providing sensor imagery;
- synthetic imagery supplementing the sensor imagery and including a common view window mapped to a dedicated position within the synthetic imagery;
- a first display wherein the common view window is visible in the first display at a position that is selectable by a first user; and
- a second, virtual user including a processor wherein the processor is operable to send a line of sight of the second, virtual user to an enhanced vision system processor wherein the line of sight of the second, virtual user is visible by the first user in the common view window.

* * * * *

UNITED STATES PATENT AND TRADEMARK OFFICE
CERTIFICATE OF CORRECTION

| | |
|---|---|
| PATENT NO. | : 8,508,435 B2 |
| APPLICATION NO. | : 13/488370 |
| DATED | : August 13, 2013 |
| INVENTOR(S) | : John N. Sanders-Reed et al. |

Page 1 of 1

It is certified that error appears in the above-identified patent and that said Letters Patent is hereby corrected as shown below:

In the Claims

In column 11, beginning with line 62 thru column 12, lines 9 and 26-28, cancel claims 6, 7 and 11.

In column 14, lines 6-20, cancel claim 22.

Signed and Sealed this
Twenty-first Day of October, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,508,435 B2
APPLICATION NO. : 13/488370
DATED : August 13, 2013
INVENTOR(S) : John N. Sanders-Reed et al.

It is certified that error appears in the above-identified patent and that said Letters Patent is hereby corrected as shown below:

On the title page, under abstract "25 Claims, 3 Drawing Sheets" should read --21 Claims, 3 Drawing Sheets--.

In the Claims

In column 11, beginning with line 62 thru column 12, lines 9 and 26-28, cancel claims 6, 7 and 11.

In column 14, lines 6-20, cancel claim 22.

This certificate supersedes the Certificate of Correction issued October 21, 2014.

Signed and Sealed this
Second Day of December, 2014

Michelle K. Lee
*Deputy Director of the United States Patent and Trademark Office*